(12) United States Patent
Bachmaier et al.

(10) Patent No.: US 9,013,126 B2
(45) Date of Patent: Apr. 21, 2015

(54) ENERGY STORAGE DEVICE AND OPERATING METHOD

(75) Inventors: Georg Bachmaier, München (DE); Dominik Bergmann, Sachsenkam (DE); Matthias Gerlich, München (DE); Guillaume Pais, München (DE); Christian Tump, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/499,390

(22) PCT Filed: Sep. 10, 2010

(86) PCT No.: PCT/EP2010/063318
§ 371 (c)(1),
(2), (4) Date: Mar. 30, 2012

(87) PCT Pub. No.: WO2011/039046
PCT Pub. Date: Apr. 7, 2011

(65) Prior Publication Data
US 2012/0181957 A1 Jul. 19, 2012

(30) Foreign Application Priority Data
Sep. 30, 2009 (DE) .................... 10 2009 047 782

(51) Int. Cl.
*H02P 3/14* (2006.01)
*H02K 41/02* (2006.01)
(Continued)

(52) U.S. Cl.
CPC .............. *H02K 16/025* (2013.01); *B60L 11/16* (2013.01); *B60L 11/18* (2013.01); *Y02T 10/7005* (2013.01); *Y02T 10/7033* (2013.01); *Y02T 10/641* (2013.01)

(58) Field of Classification Search
CPC .... Y02E 60/16; H02K 16/025; H02K 5/1725; H02K 15/16; H02K 7/1016; H02K 1/185; H02K 7/02; H02P 3/14; B60L 11/18; Y02T 10/7033; Y02T 10/641
USPC ........ 318/376, 139; 322/4; 180/165; 74/5.95; 310/12.14; 505/166
See application file for complete search history.

(56) References Cited

U.S. PATENT DOCUMENTS 5,314,868 A * 5/1994 Takahata et al. .............. 505/166
5,931,249 A 8/1999 Ellis et al.
(Continued)

FOREIGN PATENT DOCUMENTS

DE 28 23 225 * 11/1979 ................ B60L 9/00
DE 2823225 * 11/1979 ................ B60L 9/00
(Continued)

OTHER PUBLICATIONS

International Search Report for PCT/EP2010/063318, mailed on Feb. 28, 2011.
(Continued)

*Primary Examiner* — Bentsu Ro
*Assistant Examiner* — Zemenay Truneh
(74) *Attorney, Agent, or Firm* — Staas & Halsey LLP

(57) ABSTRACT

In order to store excess kinetic energy, an energy storage device and an operating method are described, in which the kinetic energy can be partially converted into electrical energy by a first electric machine using at least two electric machines arranged on a shaft and can be partially converted into additional kinetic energy, such as rotational energy, by a second electric machine. The method for energy storage of excess kinetic energy provides for converting kinetic energy partially into electric energy and partially into additional kinetic energy, such as rotational energy.

11 Claims, 1 Drawing Sheet

(51) Int. Cl.
  *F16C 39/06* (2006.01)
  *H02K 16/02* (2006.01)
  *B60L 11/16* (2006.01)
  *B60L 11/18* (2006.01)

(56) References Cited

U.S. PATENT DOCUMENTS

2004/0026927 A1    2/2004  Stevenson et al.
2008/0143302 A1 *  6/2008  Pierce .............................. 322/4

FOREIGN PATENT DOCUMENTS

| DE | 69408330 | 8/1998 | | |
| DE | 10012497 | 9/2001 | | |
| DE | 10336402 | 3/2005 | | |
| DE | 10 2009 047 782.9 | 9/2009 | | |
| GB | 2078016 | * 5/1980 | ............... | H02K 7/02 |
| GB | 2 078 016 | * 12/1981 | ............... | H02K 7/02 |
| GB | 2078016 | 12/1981 | | |
| GB | 2078016 A | * 12/1981 | ............... | H02K 7/02 |
| JP | 11-168852 | 6/1999 | | |
| WO | PCT/EP2010/063318 | 9/2010 | | |

OTHER PUBLICATIONS

German Office Action for Germany Priority Patent Application No. 10 2009 047 782.9, issued on Apr. 5, 2011.
German Office Action for Germany Priority Patent Application No. 10 2009 047 782.9, issued on Apr. 23, 2010.
European Office Action issued on Feb. 2, 2015 in corresponding European Patent Application No. 10 754 724.2.

* cited by examiner

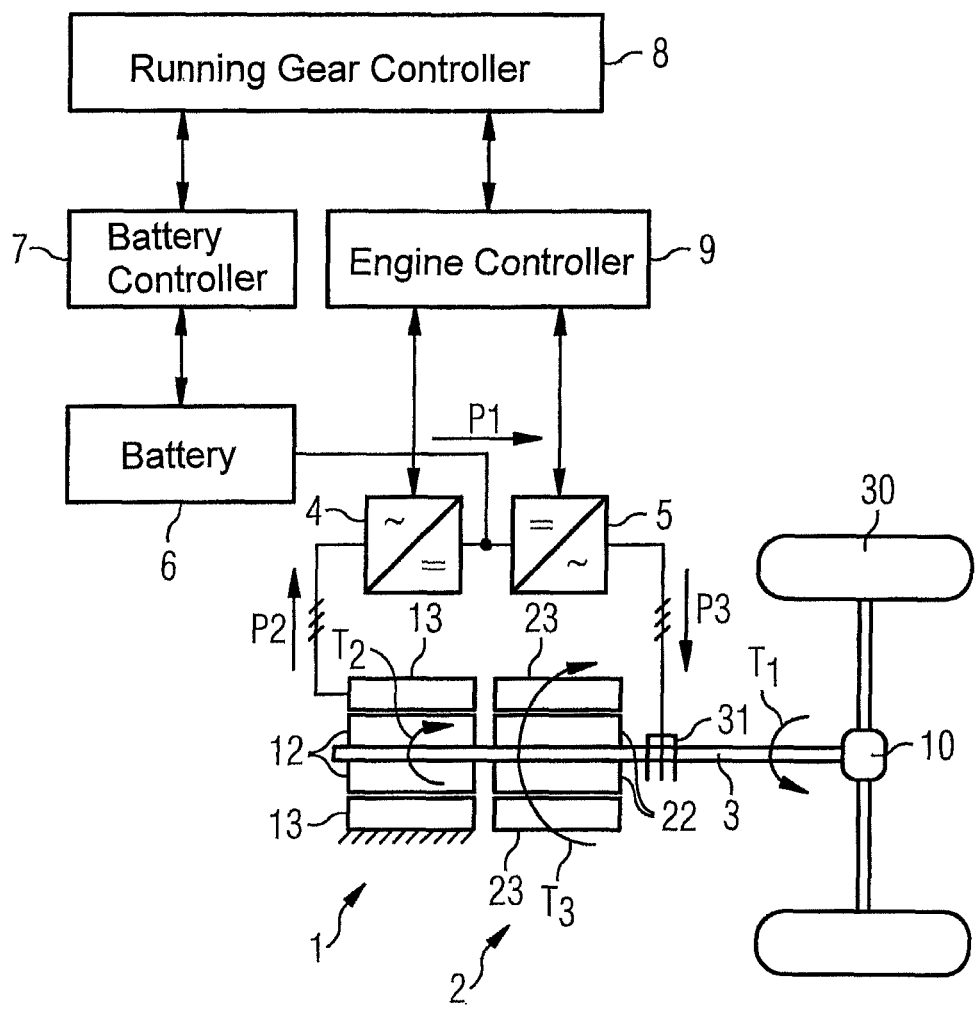

ENERGY STORAGE DEVICE AND OPERATING METHOD

CROSS REFERENCE TO RELATED APPLICATIONS

This application is based on and hereby claims priority to International Application No. PCT/EP2010/063318 filed on Sep. 10, 2010 and German Application No. 10 2009 047 782.9 filed on Sep. 30, 2009, the contents of which are hereby incorporated by reference.

BACKGROUND

The invention relates to an energy storage device.

A conventional form of energy into which, for example, excess kinetic energy is converted is, for example, chemical energy, wherein kinetic energy is initially converted into current by which, for example, a lead battery is charged. Generated electrical current may also be stored as electrical energy, for example in capacitors, in particular in high-performance capacitors, so-called "supercaps". A further possibility relates to storing mechanical energy as kinetic or potential energy, wherein a flywheel storage system may be cited as a variant.

Such energy storage devices are able to used, for example, in hybrid or electric vehicles. In particular high-performance capacitors are used as highly dynamic buffer stores for storing electrical energy. Expediently, in an energy storage device, two electrical machines with converters are required as in a conventional flywheel, which in each case have to be designed for the maximum power of the energy source, one for storage mode and one for recuperation. Thus, for example, the size of the device is increased and the energy density of the storage device is reduced. The level of efficiency of flywheels is substantially determined by conversion losses and by the bearing friction.

High-performance capacitors or conventional flywheels with two electrical machines as energy converters are used, for example, as highly dynamic buffer stores. A drawback with such capacitors is generally that the high dependency on temperature leads to a short service life and thus to high costs and accordingly to low performance. Capacitors are able to achieve efficiency levels of more than 95%. As regards the energy density, however, the capacitors only have values of 2-5 Wh/kg. In contrast, flywheel storage systems are associated with efficiency levels of 90-95%, with an energy density of up to 50 Wh/kg.

Due to the fact that the energy content is scaled quadratically with the rotational speed, it is desirable to achieve the highest possible rotational speeds which are substantially limited by the tearing value of the rotor material. Materials such as carbon fiber-reinforced plastics (CFRP) or glass fiber-reinforced plastics (GFRP), in spite of their low density compared to steel, in theory have a maximum energy density of 1570 kJ/kg due to their high tear resistance. Where steel is used as the material, this value is 106 kJ/kg.

The high level of efficiency of flywheels has hitherto been improved by optimizing the magnetic mounting, together with partial evacuation of the rotor.

As most flywheel storage systems operate by electricity, in order to accelerate and brake the rotor, the latest developments have to be taken into account with regard to carbon fibers in composite materials, for example. The number of rotations to be applied per minute amounts to 20-50,000 or more, for example.

SUMMARY

One possible object is to provide an energy storage device for the reliable management of load peaks in the transmission of energy and for reducing the size of electrical machines. An operating method could satisfy the same requirements.

The inventors recognized that the dual energy conversion required when using conventional flywheels in the previous embodiment may be designed to be substantially more efficient. The two electrical machines used in the related art and which comprise converters in combination with conventional flywheels, have to be designed in each case for the maximum power to be transferred.

According to the inventors' proposal at least two electrical machines are attached to a shaft, from which the excess kinetic energy may be received, wherein one portion of the kinetic energy is converted by a first electrical machine into electrical energy and the further portion of the kinetic energy is converted by a second electrical machine into a different form of kinetic energy.

Firstly, a generator is advantageously used as a first electrical machine, which is supplied with mechanical energy and/or kinetic energy via the shaft. Secondly, for converting kinetic energy into a different form of kinetic energy, a flywheel storage system, which is also arranged on the shaft, is advantageously used, wherein kinetic energy from the shaft is directly transmitted to the flywheel storage system.

The construction of the electrical machines is advantageously designed such that the first electrical machine has a first stator which is positioned in a stationary manner, as well as a first rotor which is connected to the shaft, and rotates at the same velocity as the shaft.

The construction of the second electrical machine differs from the related art, substantially by the second stator which is not stationary as is usually the case.

The second electrical machine is advantageously designed so that it comprises a second stator which is not fixed in a stationary manner but is connected to the shaft and rotates at the same angular velocity as the shaft, wherein the rotor which runs on the outside functions as a flywheel, so that the second electrical machine represents a flywheel storage system.

The dual function of the first electrical machine which is used both as a generator during the charging process and as a drive motor for the operation of a vehicle is particularly advantageous.

The distribution of the excess kinetic energy to the first electrical machine and the second electrical machine may be designed to be variable. A distribution at the power ratio of approximately 1:1 is advantageous.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The accompanying figure shows schematically a drive shaft which, on the one hand, is coupled via a mechanical differential 10 to a drive axle with wheels 30 and, on the other hand, is connected to and/or carries at least one first and at least one second electrical machine, a generator and a flywheel storage system.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The accompanying figure shows schematically a drive shaft which, on the one hand, is coupled via a mechanical differential 10 to a drive axle with wheels 30 and, on the other hand, is connected to and/or carries at least one first and at least one second electrical machine, a generator and a flywheel storage system. Multiple arrangements of the first and second electrical machines are possible. The generator and flywheel storage system do not have to be present in pairs.

The proposed device may be seen clearly in the schematic figure. Both the first electrical machine 1 and the second electrical machine 2 are arranged on the shaft 3. In this case, both the first rotor 12 belonging to the first electrical machine 1 and the second stator 22 assigned to the second electrical machine are arranged on the shaft 3 and rotate at the same angular velocity as the shaft.

When storing excess kinetic energy which is supplied by the shaft 3, the electrical machine 1 functions as a generator but may also be used as a drive motor and thus as a drive for the shaft. The first stator 13 of the first electrical machine 1 is positioned in a stationary manner as is usually the case. The first stator 13 is electrically connected to the first converter 4 for converting alternating current into direct current. The second stator 22 of the second electrical machine 2 is accordingly connected to the second converter 5 via slip rings 31 which communicate with the shaft 3, for converting alternating current into direct current.

The flywheel 23 of the second electrical machine 2 rotates relative to the second stator 22, which in turn rotates at the angular velocity of the shaft 3. However, the second stator 22 is denoted in this case as the stator.

The problem of the dual energy conversion of conventional flywheels is resolved by the second stator 22 of the second electrical machine 2 not being fixed as in conventional flywheels, but being connected to the drive shaft and being supported thereon. Thus the stator 22 rotates at the angular velocity of the shaft 3. The rotational speed of the flywheel 23, which corresponds to the actual rotor of the second electrical machine 2, is generally different from the rotational speed of the shaft 3, so that a difference in rotational speed results.

By the exemplary embodiment, the electrical energy generated in the electrical machine 1 and the further rotational energy/kinetic energy of the flywheel 23 generated in the electrical machine 2 may be advantageously converted at a power ratio of 50:50. Other ratios may also be set which take into account specific designs of vehicle parts or energy storage units.

If, in an arrangement corresponding to the accompanying schematic figure, it is assumed that half of the power received is converted into electrical power by the first electrical machine 1 and the kinetic energy received is in turn converted into mechanical power by the second electrical machine 2, a distribution of 1:1 is present. In this case, highly dynamic components during operation of the vehicle, with a plurality of positive and negative acceleration states, may be advantageously received by the flywheel 23 and subsequently made available again, for example when the vehicle is started up again, wherein a base load may be provided by the battery 6.

For controlling the entire system, the following are also present: a control unit 7 for the battery 6, a control unit 8 for the running gear and an engine control unit 9. A mechanical differential 10 is present on the mechanical side.

In the energy storage state, when the shaft 3 is braked, the following applies: the power P1 corresponds to the power of the battery. The power P2 corresponds to the power of the first electrical machine 1, substantially to a braking torque of the electrical machine 1. The power P3 corresponds to the power of the second electrical machine 2, substantially to a braking torque.

The torsional moment T1, T2, T3, illustrated in each case by arrows, is in each case schematically shown and in an orientation which relates to the storage process of the excess kinetic energy.

Numerical Example

The shaft 3 rotates at 600 1/s and is intended to be braked, for example, at a power of 60 kW.

To this end, a braking torque of T=−100 Nm is applied.

The first electrical machine 1 is operated as a generator with the braking torque T2=−50 Nm.

The recovered power P2 is

50 Nm*600 1/s=−30 kW.

The power from the battery is set to 0.

It follows that the power P3 equals the power P2.

Thus the second electrical machine 2 is driven at the power P3.

The difference in velocity between the second stator 22 and the flywheel 23 is initially 600 1/s.

Where P2=P3 a driving torque of T3=50 Nm results.

As the second stator 22 of the second electrical machine 2 is supported on the shaft, the shaft 3 is additionally braked at 50 Nm.

A total of 60 kW results.

Braking the shaft at 100 Nm reduces the rotational speed of the shaft and the rotational speed of the flywheel 23 increases in comparison with the moments of inertia of the flywheel 23 relative to the vehicle. In order to supply the energy stored in the flywheel back to the shaft, the illustrated sequence is carried out in reverse.

In order to brake the shaft at 100 Nm, therefore, in each case only half the torque has to be applied by both machines in comparison with the embodiment according to the related art.

In purely electrical vehicles, the first machine 1 may also function as a traction motor with a time delay, in addition to the generator function. The stator windings of the second electrical machine 2 are electrically connected to the converter and/or the transformer 5, for example via slip rings 31. The electrical machines may be designed both as asynchronous and synchronous machines.

The advantage is that the losses which occur during the energy conversion, which in the related art exclusively provides a conversion of kinetic energy to electrical energy and in turn from electrical energy to kinetic energy, in theory are halved. By dividing the energy transmission into an electrical component and into a mechanical component, the two electrical machines have to be designed with corresponding converters and/or transformers, in each case only for half the electrical power, in comparison with the design in the related art. Thus, constructional space and weight are saved and the energy density increased. As the second electrical machine 2 may be mounted magnetically, frictional losses may be reduced to a minimum.

Generally, when operating the vehicle with highly dynamic components, during a braking process, excess components of kinetic energy are received by a flywheel. The base load is often provided by a battery. In the braking process, the battery is also charged with a component of the excess kinetic energy, which has been electrically converted, however.

$$T1=T2+T3$$

$$P3=P2+P1$$

$$P2=T2*w_w$$

Formulae 5 where $w_w$ is the rotational speed of the shaft 3

$$P3=T3*w_g,$$

where $w_g$ is the difference in rotational speed between the second stator 22 and the flywheel 23.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. An energy storage device to store excess kinetic energy from a rotating shaft, comprising:
    a first electrical machine arranged on the shaft to convert a first portion of the kinetic energy into electrical energy; and
    a second electrical machine arranged on the shaft to transfer a second portion of the kinetic energy from the shaft into a different form of kinetic energy, the second electrical machine including a rotating stator that is connected to the rotating shaft and that rotates at an angular velocity equal to that of the shaft and a flywheel running radially outward from the rotating stator and rotating relative to the rotating stator,
    wherein there is an approximately 1:1 ratio between the first portion of the kinetic energy and the second portion of the kinetic energy.

2. The energy storage device as claimed in claim 1, wherein the first electrical machine is a generator to convert the first portion of the kinetic energy into electrical energy, and provide charging current to a battery or high-performance capacitor, and
    the second electrical machine is a flywheel storage system to transfer the second portion of the kinetic energy from the shaft into rotational kinetic energy of a flywheel.

3. The energy storage device as claimed in claim 2, wherein the second electrical machine comprises:
    a rotating stator which is fastened to the shaft and rotates at an angular velocity equal to that of the shaft; and
    a flywheel running radially outward from the rotating stator.

4. The energy storage device as claimed in claim 3, wherein the first electrical machine comprises:
    a stationary stator which is stationary; and
    a rotor which is connected to the shaft and rotates at an angular velocity equal to that of the shaft.

5. The energy storage device as claimed in claim 4, wherein
    in a first operating condition, the first electrical machine converts the first portion of the kinetic energy into electrical energy, and
    in a second operating condition, the first electrical machine serves as a drive motor to drive the shaft.

6. The energy storage device as claimed in claim 5, wherein there is an approximately 1:1 ratio between the first portion of the kinetic energy and the second portion of the kinetic energy.

7. The energy storage device as claimed in claim 1, wherein the first electrical machine comprises:
    a stationary stator which is stationary; and
    a rotor which is connected to the shaft and rotates at an angular velocity equal to that of the shaft.

8. The energy storage device as claimed in claim 1, wherein
    in a first operating condition, the first electrical machine converts the first portion of the kinetic energy into electrical energy, and
    in a second operating condition, the first electrical machine serves as a drive motor to drive the shaft.

9. A method for storing excess kinetic energy from a rotating shaft, comprising:
    converting a first portion of the kinetic energy into electrical energy, using a first electrical machine; and
    converting a second portion of the kinetic energy, using a second electrical machine, into a different form of kinetic energy, the second electrical machine including a rotating stator that is connected to the rotating shaft and that rotates at an angular velocity equal to that of the shaft and a flywheel running radially outward from the rotating stator and rotating relative to the rotating stator,
    wherein there is an approximately 1:1 ratio between first portion of the kinetic energy and the second portion of the kinetic energy.

10. The method as claimed in claim 9, wherein
    the first electrical machine is operated as a generator, and
    the second electrical machine is operated as a flywheel storage system.

11. The method as claimed in claim 9, wherein there is an approximately 1:1 ratio between first portion of the kinetic energy and the second portion of the kinetic energy.

* * * * *